United States Patent
Kruse

Patent Number: 5,824,194
Date of Patent: Oct. 20, 1998

[54] FRACTIONATOR SYSTEM FOR DELAYED COKING PROCESS

[75] Inventor: Charles J. Kruse, Cypress, Tex.

[73] Assignee: Bechtel Corporation, Houston, Tex.

[21] Appl. No.: 779,396

[22] Filed: Jan. 7, 1997

[51] Int. Cl.[6] ............................. C10B 21/18; B01D 3/14; C10G 9/14
[52] U.S. Cl. ............................. 201/29; 201/30; 202/198; 202/261; 196/134; 196/139; 196/141; 208/131
[58] Field of Search ..................... 196/134, 139, 196/141; 201/29, 30; 202/198, 261; 208/131

[56] References Cited

U.S. PATENT DOCUMENTS

| | | | |
|---|---|---|---|
| 4,455,219 | 6/1984 | Janssen et al. | 208/131 |
| 4,518,487 | 5/1985 | Graf et al. | 208/131 |
| 4,543,061 | 9/1985 | Edwards | 432/115 |
| 4,549,934 | 10/1985 | Graf et al. | 196/98 |
| 4,618,051 | 10/1986 | Skraba | 196/139 |
| 4,621,724 | 11/1986 | Godino et al. | 196/139 |
| 4,626,320 | 12/1986 | Alworth et al. | 201/2 |
| 4,686,027 | 8/1987 | Bonilla et al. | 208/39 |
| 4,894,144 | 1/1990 | Newman et al. | 208/131 |
| 4,994,169 | 2/1991 | Godino et al. | 208/50 |
| 5,092,982 | 3/1992 | Becraft | 208/131 |
| 5,158,668 | 10/1992 | Charhar et al. | 208/50 |
| 5,160,602 | 11/1992 | Becraft et al. | 208/131 |
| 5,174,891 | 12/1992 | Becraft | 208/131 |
| 5,350,503 | 9/1994 | Freymeyer et al. | 208/131 |

Primary Examiner—Nina Bhat
Attorney, Agent, or Firm—Pravel, Hewitt & Kimball

[57] ABSTRACT

An improved coker fractionator system which permits withdrawing, from selected ports in the fractionator, streams of selected boiling point ranges for recovery of thermal energy and for altering the liquid vapor loading within the column for more efficient fractionation within the column. The system includes the provision of one or more ports in a fractionation column between the light coker gas oil draw and the heavy coker gas oil draw connected to either a thermal energy recovery pump-around system or a recycle system for returning a stream to the coker furnace feed stream.

11 Claims, 1 Drawing Sheet

# FRACTIONATOR SYSTEM FOR DELAYED COKING PROCESS

SPECIFICATION

1. Field of the Invention

This invention relates to delayed coking of hydrocarbons. More specifically, the invention provides an improved method and apparatus for fractionating volatile vapors generated during the delayed coking process.

2. Background of the Invention

Delayed coking processes have been used in the prior art to thermally decompose heavy liquid hydrocarbons into gases, liquid streams of various boiling ranges, and coke. The delayed coking process involves heating hydrocarbon liquids in a coking furnace and transferring the heated liquids to a coking drum where the liquids decompose into coke and volatile components.

In order to practically use the delayed coking process, a coker fractionation system is needed along with the coking furnace and coking drums. The coker fractionating system separates the volatile components generated in the coking drum into various hydrocarbon streams.

In the basic delayed coking process, a liquid hydrocarbon feedstock is initially added to the bottom of a coker fractionator column where it mixes with the column bottoms liquid which is referred to as "natural recycle material." This mixture of feedstock and natural recycle material is taken from the column bottom and then pumped through furnace tubes of the coking furnace where it is heated to about 1000° F. The heated stream is then transferred to the coking drum where the temperature and pressure are maintained at coking conditions such that the stream decomposes into coke and volatile components. The volatile components, called "coke drum vapors", are then returned to the coker fractionating system for separation into various components. When the coke drum becomes full of solid coke, the heated stream from the coker furnace is diverted to another coke drum and the full coke drum is cooled and emptied.

The coker fractionating system used in the delayed coking process generally includes a fractionator column which includes a reservoir for the heavy recycle material and feedstock mixture at the bottom of the column. Above the reservoir is a flash zone, an open area within the column, into which the coke drum vapors are introduced. The heaviest components of the coke drum vapors are condensed in the flash zone and the remaining vapors are fractionated by multiple trays above the flash zone. At the top of the coker fractionator column is a vapor reflux system in which at least a portion of the overhead vapor stream being discharged from the column is condensed and returned to the top fractionator tray. The remainder of the condensed overhead vapor stream is withdrawn as an unstabilized naphtha product.

Traditionally, two liquid streams are removed from the coker fractionating system at different points in the fractionating column. A light coker gas oil stream is removed from a tray near the top of the fractionator to provide one end product of the system. This is known as the light coker gas oil draw. The second stream is a heavy coker gas oil stream removed near the bottom fractionation tray to provide a second end product of the system. This is known as the heavy coker gas oil draw.

Generally, a portion of this second stream is returned to the column as part of a pump-around system. Pump-around systems are generally used to recover thermal energy from the fractionator column and include a pump and a heat exchanger to provide heat to another process stream or to generate steam. When the pump-around system is connected to the heavy coker gas oil draw, thermal energy is removed from the lower part of the fractionation system. The removal of heat at this point in the column reduces fractionation efficiency and results in a heavy coker gas oil product stream which contains light end hydrocarbons. These light end hydrocarbons are removed by further processing to meet the heavy coker gas oil product's commercial specification requirements. Typically, this is done by providing an additional steam stripping system which includes a stripping column, multiple product pumps, and a heat exchanger for recovering heat from the stripping column.

Additionally, portions of the light coker gas oil stream have been added to the coker feedstock instead of natural recycle material thereby improving the liquid yields of the coking and fractionation systems, as disclosed for example in U.S. Pat. No. 4,455,219 issued to Janssen et al entitled "Method of Reducing Coke Yield", U.S. Pat. No. 4,549,934 issued to Graf et al entitled "Flash Zone Draw Tray For Coker Fractionator," and U.S. Pat. No. 4,518,487 issued to Graf et al entitled "Process for Improving Product Yields from Delayed Coking."

SUMMARY OF THE INVENTION

The present invention provides an improved coker fractionation system which permits withdrawing, from selected ports in the fractionator column located between the light coker gas oil draw and the heavy coker gas oil draw, streams of selected boiling point ranges for recovery of thermal energy and for altering the liquid/vapor loading within the column for more efficient fractionation within the column. The invention further includes the provision of one or more ports in the fractionator column between the light coker gas oil draw and the heavy coker gas oil draw which are for connection to a recycle system for returning a stream to the coker furnace feed stream.

BRIEF DESCRIPTION OF THE DRAWING

A better understanding of the invention can be obtained when the detailed description set forth below is reviewed in conjunction with the accompanying Drawing, in which.

DETAILED DESCRIPTION OF PREFERRED EMBODIMENT

Figure 1:
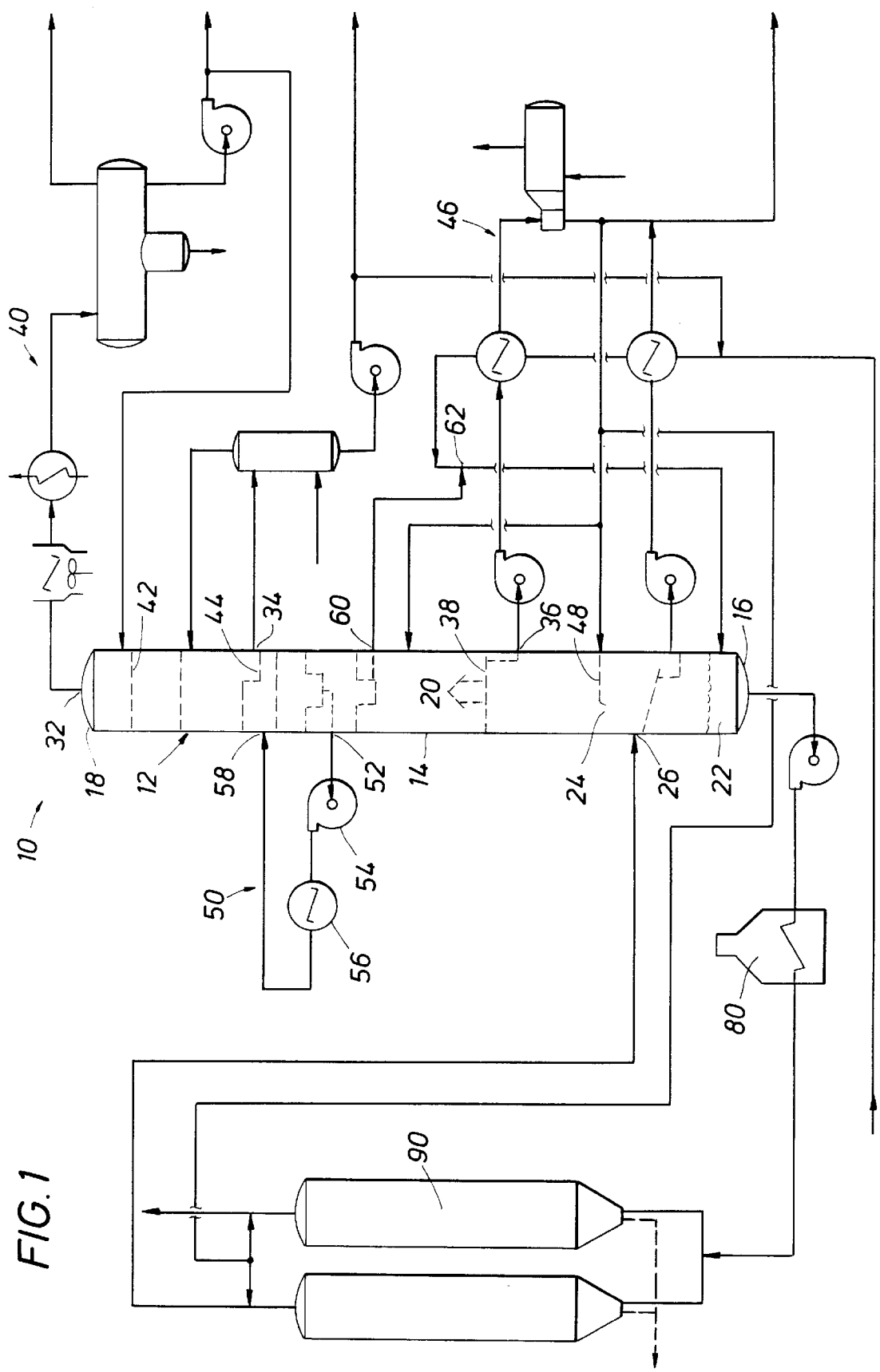
FIG. 1 is a schematic diagram of a delayed coking process utilizing a preferred embodiment of the present invention.

FIG. 1 illustrates a delayed coking process plant incorporating features of the present invention. As illustrated, the process plant includes a coking furnace 80, a coking drum 90, and coker fractionating system 10, which functions to separate coke drum vapors received from the coke drum 90 into various hydrocarbon streams.

As illustrated, the coker fractionating system 10 includes a vessel or column 12 having multiple separation trays 20, a light coker gas oil draw 34, a heavy coker gas oil draw 36, and a vapor outlet 32. The illustrated column 12 includes sidewalls 14, bottom end 16 and upper end 18, with the separation trays 20 located within the sidewalls 14 and between the two ends 16 and 18. The bottom end 16 of the column 12 and column sidewalls 14 define a bottom reservoir 22. Flash zone 24 is located between the bottom reservoir 22 and the separation trays 20. A coke drum vapor inlet 26 is located in the sidewalls 14 adjacent to the flash zone 24 for introducing coke drum vapors into the flash zone 24 of the column 12. The column 12 operates to convert the coke drum vapors into useful end products by the fractionation process performed by the separation trays 20. As will be appreciated in light of the following discussion, the invention is not limited to any particular type of fractionator column or fractionation process and can be practiced with a packed fractionator column using any type of column packing materials as well as with various types of trayed columns having any number of trays.

The illustrated column 12 further includes a vapor outlet 32 connected to a vapor reflux system 40 for condensing some portion of vapor removed from the column and returning it to the top fractionation tray 42. A light coker gas oil draw 34 is provided near one of the top trays of the column 12 for withdrawing a light end product, i.e. light coker gas oil, from the column. A heavy coker gas oil draw 36 is provided near one of the bottom trays of the column 12 for withdrawing a heavy end product, i.e. heavy coker gas oil. As shown a heavy coker gas oil pump-around system 46 is connected to the draw 34 to remove heat from the column 12 by way of a heat exchanger.

Turning now to particular features of the present invention, as shown in the Drawing, fractionator column 12 is provided with an upper middle outlet port 52 which functions to enable heat to be extracted from the column 12 at a selected point below the light coker gas oil draw 34. An additional port, e.g. lower middle outlet port 60, can be provided to enable distillate recycle to be extracted at a selected point above the heavy coker gas oil draw 36. Either of the outlet ports 52 or 60 can be connected to a pump around system for heat recovery or to a recycle system for use of liquid drawn from the port as a feedstock additive. The ability to remove heat from the column 12 at a point between the heavy coker gas oil draw 36 or the light coker oil draw 34 enables control of internal liquid refluxing within the column 12 to enhance product quality, as will be better appreciated in light of the example below.

Returning to the illustrated embodiment, the upper middle outlet port 52 is shown connected to a middle pump-around system 50 which includes a pump 54, heat exchanger 56 and return port 58. In operation, a middle stream is removed from the column 12 at the upper middle port 52, is pumped by the middle system pump 54 through the heat exchanger 56, and returned to the column at the return port 58, which is located above the upper middle outlet port 52.

As can be appreciated, the heat exchanger 56 can be of any type which provides an appropriate heat exchange balance for the particular fractionating system. The temperature of the middle stream is generally high enough to use in cross-exchanger services where heavy coker gas oil pump-around systems were traditionally used. Further, the temperature of the middle stream is generally much higher than temperatures associated with light coker gas oil pump-around systems and this can result in a more efficient heat removal system.

When used in addition to a heavy gas oil pump-around system such as the illustrated system 46, the middle pump-around system 50 reduces the amount of heat that must be removed by the system 46 and thereby results in more internal liquid refluxing within the column 12 between the heavy coker gas oil draw 36 and the light coker gas oil draw 34. The increased internal liquid refluxing provides better fractionation and therefore a cleaner separation of the various product streams produced by them. Depending upon the thermal requirements of the particular fractionator, the present invention may eliminate the need for a heavy coker gas oil pump-around system. Additionally, the need for a heavy coker gas oil stripper system is eliminated by providing enough liquid refluxing within column 12 to improve the quality of the heavy coker gas oil stream removed from the draw 36, i.e., sufficiently reducing lower boiling hydrocarbon components to provide an acceptable end product.

In addition to recovering heat and providing improved fractionation between the light coker gas oil draw 34 and the heavy coker gas oil draw 36, the utilization of an upper middle port 52 and the middle pump-around system 50 can decrease can the size and initial investment requirements for the column 12 itself. The removal of heat through the middle pump-around system 50, as opposed to the removal of heat through a heavy coker gas oil pump-around system, results in a better balancing of the liquid and vapor loading within the column. Better balancing of the liquid and vapor loading in turn allows the use of fractionator tray designs which can reduce the column diameter requirements and the vertical height required for transitions between the trays.

Alternatively, or in addition to the upper middle port and middle pump around system 50, improved fractionation efficiency can be gained by way of the lower middle outlet port 60. In the illustrated embodiment, the lower middle outlet port 60 is located below the upper middle outlet port 52 and above the heavy coker gas oil draw 36 and is connected to a recycle system to permit withdrawal of a middle distillate recycle stream. The middle distillate recycle stream can be pumped or gravity fed into a mixing point 62 where it is mixed with fresh coker feedstock to favorably impact coker yield distribution.

The exact location of the middle distillate recycle port 60 depends upon the desired content of the middle distillate recycle stream. Generally, the middle distillate recycle stream desired will contain material within a boiling point range of about 350° F. and about 850° F. When used with a middle pump-around system such as the above described system 50, the middle distillate recycle stream will have a more narrow range of boiling points which will facilitate choosing the appropriate location between the heavy coker gas oil draw 36 and the light coker gas oil draw 34 to maximize production efficiency.

The following example is to illustrate the present invention and is not intended to limit the scope of the present invention in any way.

EXAMPLE

A design for an improved coker fractionation system according to the present invention is compared to a conventional fractionation system in Table 1 for a 40,000 BPSD coker feed.

In the improved coker fractionation system, less heat is removed in the heavy coker gas oil pump-around, as compared to the conventional system, allowing more liquid refluxing between the light and heavy coker gas oil product draws which provides better fractionating. A heavy coker gas oil pump-around scheme is used to heat coker feed and to generate steam prior to separating the heavy coker gas oil product stream. Heat is also recovered from a middle pump-around system and used to reboil coker gas plant debutanizer and stripper columns. Both systems utilize light coker gas oil for distillate recycle.

The conventional fractionation system uses a light coker gas oil pump-around system in conjunction with a heavy coker gas oil pump-around system to recover heat from the fractionator. The heavy coker gas oil pump-around is used to heat coker feed, reboil a coker gas plant debutanizer, and to generate steam. A heavy coker gas oil product is drawn with the pump-around draw, but separated and stripped, before being used to heat coker feed. The light coker gas oil pump-around is used to reboil a coker gas plant stripper column. A light coker gas oil product is drawn with the light coker gas oil pump-around draw, but is separated and stripped, before being cooled for storage.

As can be seen, there are significant differences in pump-around heat duties, draw temperatures, and circulation flow-rates. Both systems have similar product and fractionation specifications. The separation of heavy coker gas oil product is comparable to the conventional system without employing a stripper system with a 10° F. ASTM D86 overlap between the LCGO and HCGO products.

TABLE 1

| Main Fractionation Parameters | Conventional System | Improved System |
|---|---|---|
| Overhead Duty, MM Btu/hr | 78 | 88 |
| Reflux Rate, gpm | 550 | 712 |
| LCGO PA Duty, MM Btu/hr | 21 | — |
| LCGO PA Draw Temp., °F. | 403 | — |
| LCGO PA Flow, gpm | 997 | — |
| Mid PA Duty, MM Btu/hr | — | 49 |
| Mid PA Draw Temp., °F. | — | 550 |
| Mid PA Flow, gpm | — | 1314 |
| LCGO Strip. Steam Rate, Lb/hr | 5900 | 6700 |
| HCGO Strip. Steam Rate, lb/hr | 3900 | — |
| HCGO PA Duty, MM Btu/hr | 83 | 30 |
| HCGO PA Flow, gpm | 1699 | 498 |
| Ovhd. Naph. ASTM D86 95% Pt. | 343 | 343 |
| OH Naph./LCGO Gap, °F. | 50 | 50 |
| LCGO Prod. ASTM D86 95% Pt. | 650 | 650 |
| LCGO/HCGO Overlap, °F. | 10 | 10 |

A comparison of the same embodiment of a coker fractionation system of the present invention and the conventional fractionation system in terms of total installed costs and utility costs is shown in Table 2. Table 2 shows significant differences in major equipment sizing between the two fractionation systems.

In the present invention, the heavy coker gas oil stripper system, including the stripper, two product pumps, and the product/coker feed exchanger are not necessary. Additionally, the required capacity of the heavy coker gas oil pump-around pumps is reduced substantially. The size and cost of the fractionator column is reduced somewhat. The size of the fractionator overheads condenser and the capacity of the reflux pumps increases.

TABLE 2

| Major Fractionation Parameters | Conventional Scheme | Present Invention |
|---|---|---|
| OH Trim Condenser Area, ft² | 14000 | 15324 |
| Stripper Reboiler Area, ft² | 4980 | 2663 |
| HCGO Product/Coker Feed Exchanger Area, ft² | 3377 | not req'd |
| HCGO PA/Coker Feed Exchanger Area, ft² | 20368 | 22536 |
| HCGO Product Air Cooler Bare Tube Area, ft² | 6747 | 5995 |
| Reflux Pump Capacity, gpm | 835 | 1027 |
| LCGO PA Pump Capacity, gpm | 1197 | not req'd |
| Mid PA Pump Capacity, gpm | not req'd | 1577 |
| HCGO Prod Pump Capacity, gpm | 493 | not req'd |
| HCGO PA Pump Capacity, gpm | 2532 | 1626 |
| HCGO Stripper, Diameter (ft)/Length (ft) | 5/23.5 | not req'd |

TABLE 2-continued

| Major Fractionation Parameters | Conventional Scheme | Present Invention |
|---|---|---|

The net reduction in the estimated total installed costs using the improved fractionation system can be substantial. The net effect on utility costs is small, as electrical consumption is reduced slightly and net steam consumption differences are insignificant.

In a second comparison, the improved fractionation system of the present invention facilitates making a heavy distillate draw between the light coker gas oil and the heavy coker gas oil draws for use as distillate recycle. Increased internal reflux helps to narrow the boiling range of the recycle stream (to approximately 600–800° F. TBP) without requiring additional fractionating trays. If a heavy coker gas oil stripper system is used in conjunction with the middle pump-around scheme, even better separation between the light coker gas oil and heavy coker gas oil products is attainable.

As can now be appreciated, the above description illustrates the invention in the context of a particular delayed coker process system but is not limited to use with any particular system or any particular type of fractionator column. Various modifications in the location of middle ports, as well as types of thermal energy recovery systems and recycle systems can be used without departing from the spirit of the invention, the scope of which is defined by the following claims.

What is claimed is:

1. A method of separating coker drum vapors, comprising:
    introducing coker drum vapors into a flash zone of a coker fractionating column having multiple separation trays above the flash zone;
    removing a light coker gas oil stream from the coker fractionating column at a first draw near an upper separation tray;
    removing a heavy coker gas oil stream from the coker fractionating column at a second draw near a lower separation tray;
    removing a middle liquid stream from the coker fractionating column at a middle port between the first and second draws;
    cooling the middle liquid stream; and
    reintroducing the cooled middle liquid stream to the coker fractionator column above the middle port.

2. The method of claim 1 further comprising the step of removing a second middle stream from the coker fractionation column.

3. The method of claim 2 wherein the first and second middle streams are removed from the same location in the fractionator column.

4. In a coker fractionator column having a heavy coker gas oil draw and a light coker gas oil draw, the improvement comprising:
    a middle outlet port in the fractionation column between the heavy coker gas oil draw and the light coker gas oil draw for removing a middle stream from the column;
    a heat exchanger in fluid connection with the middle port for removing thermal energy from the middle stream; and
    a middle return port above the middle outlet port for reintroducing the cooled middle stream to the column.

5. The improvement of claim 1 further comprising a middle system pump for pumping the middle stream through the heat exchanger.

6. The improvement of claim 1 wherein the coker fractionator column is connected to a heavy coker gas oil pump-around system.

7. The improvement of claim 1 wherein the coker fractionator column is connected to a light coker gas oil pump-around system.

8. The improvement of claim 1 further comprising a middle distillate recycle port positioned on the column between the heavy coker gas oil draw and the light coker gas oil draw for removing a middle distillate recycle stream for mixing with coker feedstock.

9. The improvement of claim 8 wherein the middle distillate recycle port is positioned to allow removal of a middle distillate recycle stream having a boiling point range between about 350° F. and about 850° F.

10. The improvement of claim 8, wherein the middle outlet port and the middle distillate recycle port are both connected to a single outlet port in the fractionator column.

11. In a coker fractionator column having a heavy coker gas oil draw and a light coker gas oil draw, the improvement comprising a middle distillate recycle port positioned on the column between the heavy coker gas oil draw and the light coker gas oil draw for removing a middle distillate recycle stream for mixing with coker feedstock.

* * * * *